United States Patent Office.

WILLIAM ADAMSON, OF PHILADELPHIA, PENNSYLVANIA.

Letters Patent No. 79,177, dated June 23, 1868.

IMPROVEMENT IN THE MANUFACTURE OF LEATHER.

The Schedule referred to in these Letters Patent and making part of the same.

TO ALL WHOM IT MAY CONCERN:

Be it known that I, WILLIAM ADAMSON, of Philadelphia, Pennsylvania, have invented an Improvement in the Manufacture of Leather; and I do hereby declare the following to be a full, clear, and exact description of the same.

My invention consists in "abating" or "grainering" hides and skins with dilute phosphoric acid in place of the noxious mixtures heretofore employed for the same purpose.

In order to enable others skilled in the art to practise my invention, I will now proceed to describe the mode of carrying the same into effect.

In the manufacture of leather, it is the practice, after the hair has been removed from the hides or skins by the well-known liming process, and after they have been properly fleshed, to subject them to what is known as the "abating" or "grainering" process. Heretofore it has been usual to carry out this process by dissolving a quantity of pigeon's or dog's dung in water, and to steep the skins in this mixture for a week or ten days, with occasional removals. This "abating" process, which renders the hides, after they are tanned, soft, light, and porous, is, owing to the noxious character of the ingredients used, very offensive to the workmen; moreover, the constantly-increasing demand for the material used renders the process more or less expensive.

I have found after repeated careful experiments that dilute phosphoric acid is a most efficient and cleanly substitute for the offensive mixture heretofore employed, and an economical substitute, in view of the fact that vast quantities of this dilute phosphoric acid are formed in glue-factories, by treating, with muriatic or sulphuric acid and water, bones and horn-piths for the conversion of the same into glue-stock. The residuum, after this treatment, is dilute phosphoric acid, which has hitherto been permitted to run to waste as an article of no commercial value.

The dilute acid may be used for "abating" the hides or skins, precisely as the ordinary mixtures have been heretofore used for the same purpose.

I claim as my invention, and desire to secure by Letters Patent—

The treatment of hides or skins with the material and in the manner described for the purpose specified.

In testimony whereof, I have signed my name to this specification in the presence of two subscribing witnesses

WM. ADAMSON.

Witnesses:
 WM. A. STEEL,
 C. B. PRICE.